(12) United States Patent
Lawlor

(10) Patent No.: US 7,497,409 B2
(45) Date of Patent: Mar. 3, 2009

(54) ADJUSTABLE BEVERAGE CONTAINER HOLDER BY GEAR ACTUATION

(75) Inventor: Michael Joseph Lawlor, Mequon, WI (US)

(73) Assignee: Toyota Motor Engineering & manufacturing North America, Inc., Erlanger, KY (US)

( * ) Notice: Subject to any disclaimer, the term of this patent is extended or adjusted under 35 U.S.C. 154(b) by 6 days.

(21) Appl. No.: 11/565,153

(22) Filed: Nov. 30, 2006

(65) Prior Publication Data

US 2008/0128573 A1      Jun. 5, 2008

(51) Int. Cl.
*A47K 1/08* (2006.01)
(52) U.S. Cl. .................................. 248/311.2
(58) Field of Classification Search .............. 248/311.2
See application file for complete search history.

(56) References Cited

U.S. PATENT DOCUMENTS

| | | | |
|---|---|---|---|
| 5,054,733 A * | 10/1991 | Shields | 248/313 |
| 5,143,338 A * | 9/1992 | Eberlin | 248/313 |
| 5,154,380 A * | 10/1992 | Risca | 248/154 |
| 5,219,140 A * | 6/1993 | Spykerman | 248/311.2 |
| 5,385,325 A | 1/1995 | Rigsby | |
| 5,398,898 A | 3/1995 | Bever | |
| 5,445,350 A | 8/1995 | Rigsby | |
| 5,882,016 A | 3/1999 | Chiang | |
| 6,113,049 A * | 9/2000 | Miljanich | 248/311.2 |
| 6,286,842 B1 | 9/2001 | Huff et al. | |
| 6,705,580 B1 * | 3/2004 | Bain | 248/311.2 |
| 2005/0001127 A1 * | 1/2005 | Schaal | 248/311.2 |

* cited by examiner

*Primary Examiner*—J. Allen Shriver, II
*Assistant Examiner*—Michael McDuffie
(74) *Attorney, Agent, or Firm*—Gifford, Krass, Sprinkle, Anderson & Citkowski, P.C.

(57) ABSTRACT

The present invention affords an adjustable beverage container holder. The holder has a sleeve, a movable jaw located at least partially within the sleeve, and an adjusting ring. The sleeve has a sleeve axis and the jaw has at least one groove and a container surface that is coaxial with the sleeve axis. The adjusting ring is rotatably mounted to the sleeve and has a rigid member that engages the groove on the jaw. Upon rotation of the adjusting ring with respect to the sleeve and about the sleeve axis, the engagement of the sleeve gear tooth rigid member with the groove moves the jaw either into or away from the sleeve axis. In this manner, an adjustable beverage container holder is provided.

15 Claims, 10 Drawing Sheets

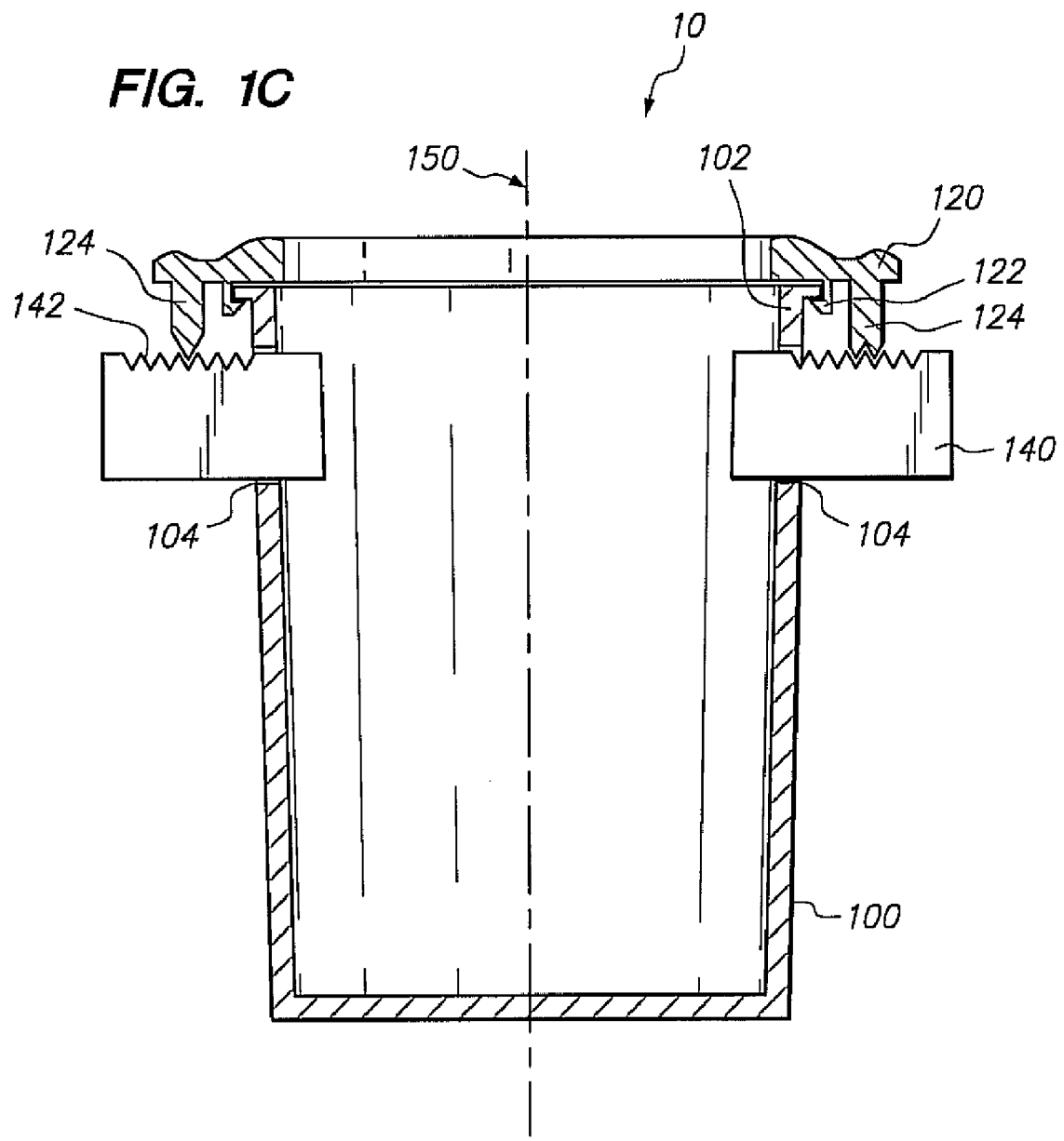

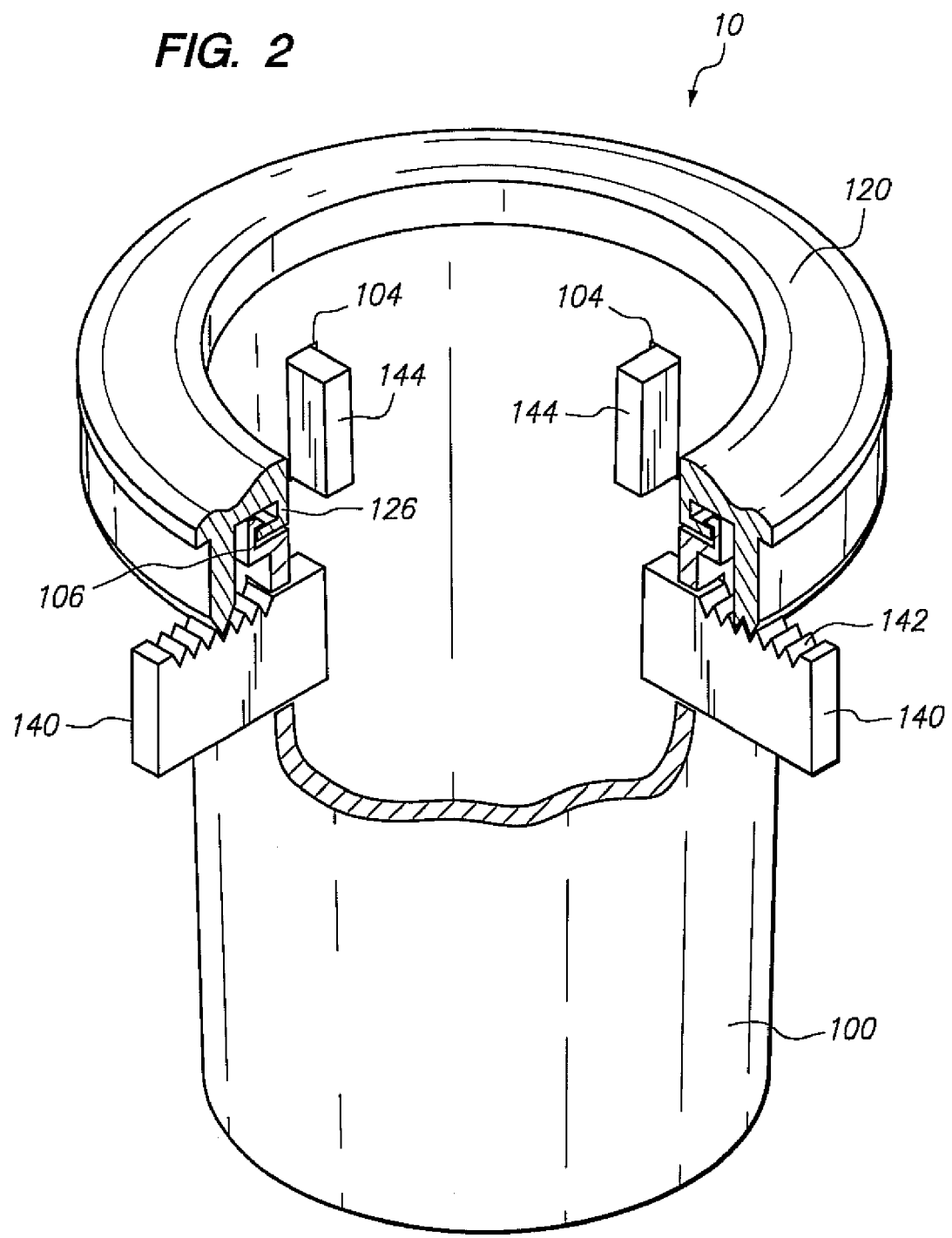

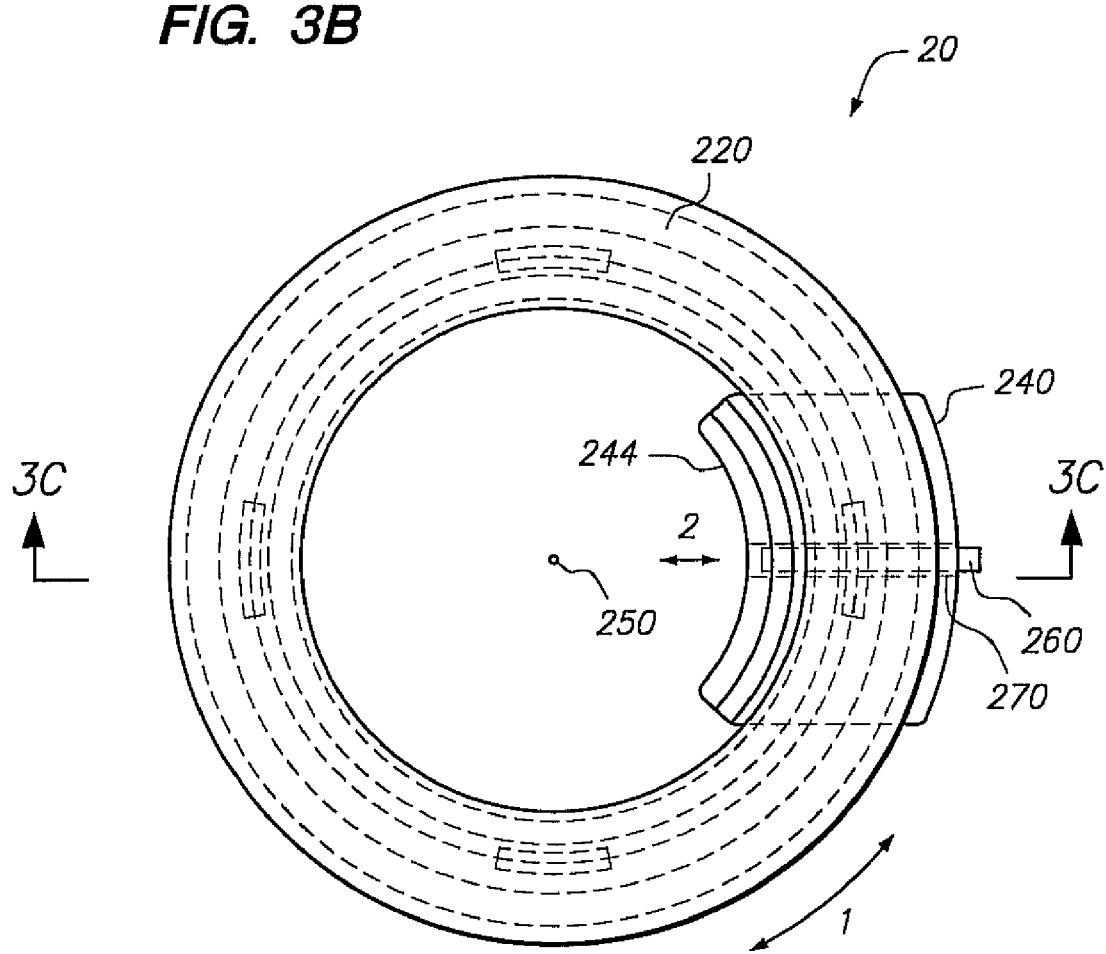

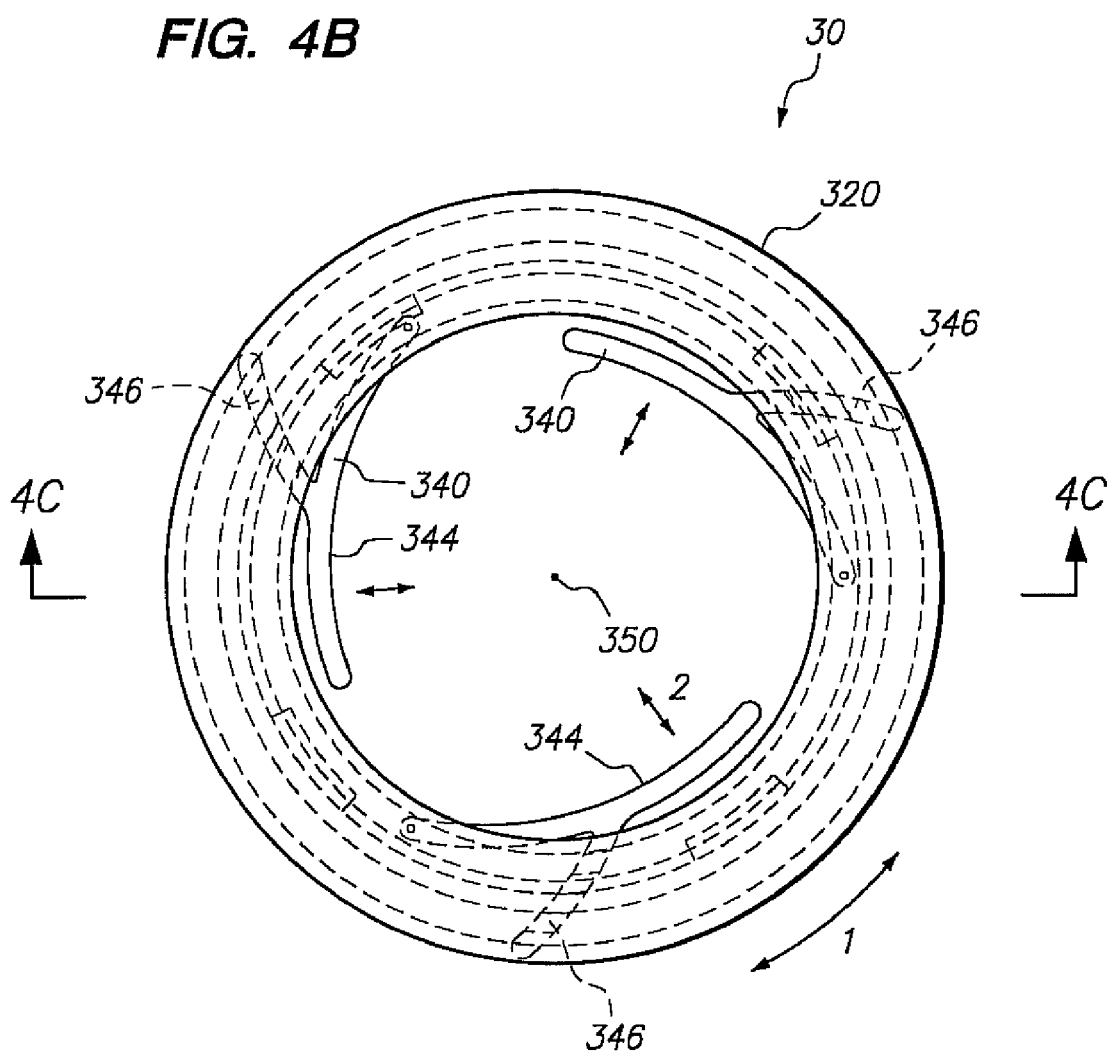

ADJUSTABLE BEVERAGE CONTAINER HOLDER BY GEAR ACTUATION

FIELD OF THE INVENTION

The present invention relates in general to a beverage container holder and in particular to an infinitely adjustable by gear actuation beverage container holder.

BACKGROUND OF THE INVENTION

Beverage container holders are commonplace in current motor vehicles. The placement of a beverage container holder in an automobile or truck aids the driver in operating the vehicle in a safe manner. In addition, the comfort of a long trip is increased when a beverage container can be safely and securely placed within the vehicle and yet easily accessed by the driver and/or a passenger. However, current beverage container holders are typically manufactured with a single inner diameter. As such, bottles, cups, glasses and other types of beverage containers can either be too large to fit within the holder or too small to be held securely.

In an effort to provide a beverage container holder that holds various sizes of containers, some holders have incorporated flexible flaps within the inner diameter of the holder, which thereby apply pressure to a container placed therein. However, these flaps become torn, damaged and ineffective due to a loss of resiliency over extended periods of time. Furthermore, some beverage containers are still too small to be held securely with flexible flaps within the inner diameter of the holder. Therefore, there is a need for a beverage container holder that has an adjustment for holding different size containers.

SUMMARY OF THE INVENTION

The present invention affords an adjustable beverage container holder. The holder has a sleeve, a movable jaw located at least partially within the sleeve, and an adjusting ring. The sleeve has a sleeve axis. The jaw has at least one groove located thereon and a container surface coaxial with the sleeve axis. The adjusting ring is rotatably mounted to the sleeve and has a rigid member that engages the groove on the jaw.

Upon rotation of the adjusting ring with respect to the sleeve and about the sleeve axis, engagement of the sleeve rigid member with the groove of the jaw affords for the movement of the jaw either into or away from the sleeve axis. In this manner, an adjustable beverage container holder is provided.

BRIEF DESCRIPTION OF THE FIGURES

FIG. 1C is a cross-sectional side view of a first embodiment of the present invention;

FIG. 2 is a perspective view of a first embodiment of the present invention showing an alternate adjusting ring engagement mechanism;

FIG. 3B is a top view of a second embodiment of the present invention;

FIG. 4B is a top view of a third embodiment of the present invention; and

DETAILED DESCRIPTION OF THE INVENTION

Figure 1A:
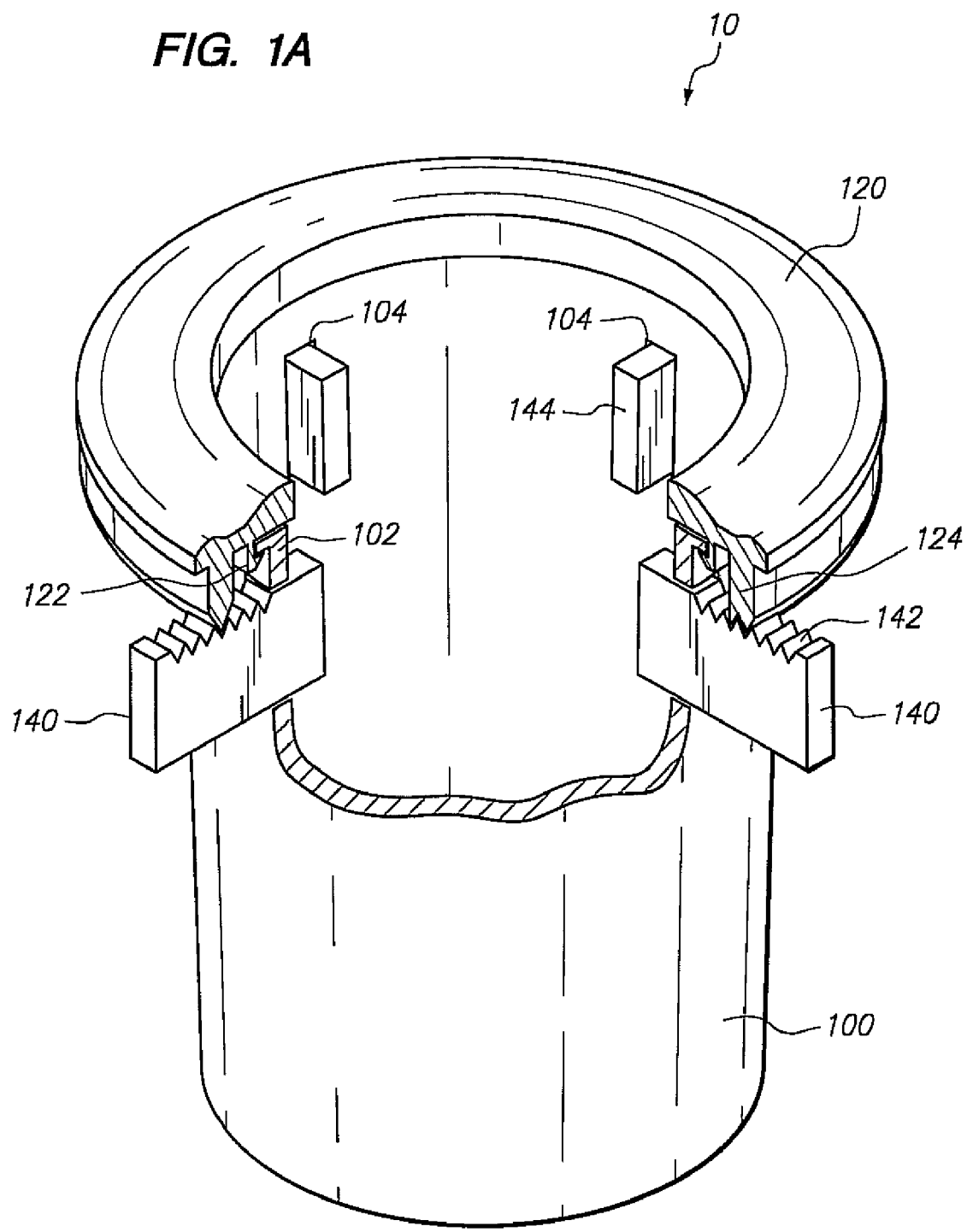
FIG. 1A is a perspective view of a first embodiment of the present invention.
Figure 1B:
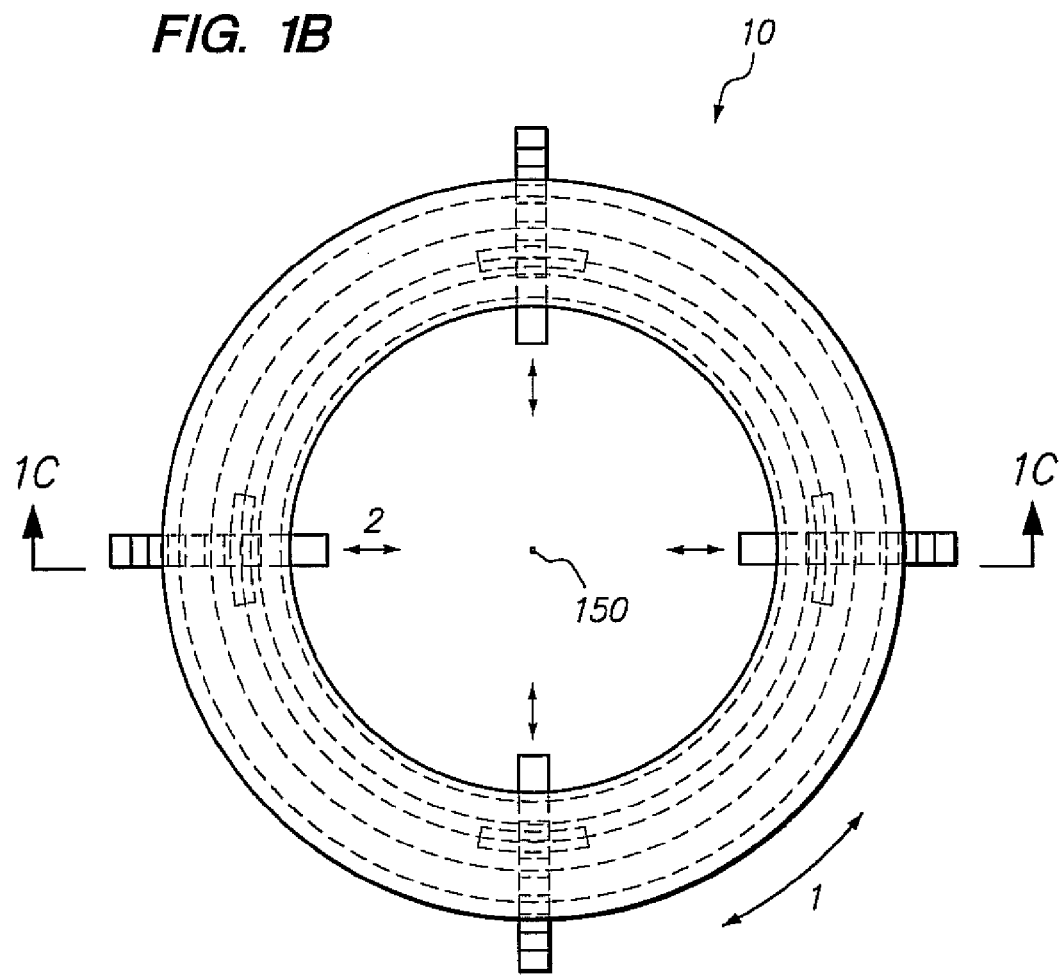
FIG. 1B is a top view of the first embodiment of the present invention.

In accordance with a first embodiment of the present invention, an adjustable beverage container holder is generally shown at 10 in FIGS. 1A-1C. The container holder 10 is comprised of a sleeve 100, an adjusting ring 120 and at least one movable jaw 140. The sleeve 100 has a sleeve axis 150, a ring attachment means 102 and at least one jaw aperture 104. The adjustment ring 120 has a sleeve attachment means 122 of ring 120. The ring attachment means 102 and sleeve attachment means 122 engage each other as shown in the figure, and yet allow rotational movement of the adjusting ring 120 with respect to the sleeve 100. In this manner, the adjusting ring 120 is afforded rotation with respect to sleeve 100 about sleeve axis 150.

In addition to sleeve attachment means 122, ring 120 has at least one rigid member 124. Rigid member 124 engages at least one groove 142 of jaw 140. Rotation of adjusting ring 120 in a clockwise or counterclockwise first direction 1 results in the movement of jaw 140 through jaw aperture 104 in an inward or outward second direction 2. The jaw 140 has a container surface 144 which is coaxial to the sleeve axis 150. Movement of the jaw 140 in the inward direction affords for contact of the container surface 144 with a beverage container and secure holding of said container. Movement of the jaw 140 in the outward directions affords for the release of a beverage container being securely held.

As illustrated in FIGS. 1A-1C, groove 142 is in the form of gear teeth. However, gear teeth are not required in order for the present invention to be operative. A single acruate groove can afford for the movement of the jaw 140 in the inward and the outward direction. In addition, it will be obvious to one skilled in the art that the present invention can include a rigid member 124 rigidly attached to a jaw 140, engaging at least one grove 142 on a ring 120, Although not shown in the figures, a guidance means can be provided to aid in the movement of jaw 140 in the inward or outward second direction 2. The guidance means can be a guide rail permanently attached to the sleeve 100 and fitting at least partially in a slot or groove within the jaw 140, a guide rail permanently attached to the jaw 140 and fitting at least partially in a slot or groove within the jaw aperture 104 and combinations thereof.

Turning to FIG. 2, alternative ring attachment means 106 and sleeve attachment means 126 are shown for the first embodiment of the present invention. Instead of using an L-shaped bracket such as ring attachment means 102 and sleeve attachment means 122 shown in FIG. 1A, FIG. 2 illustrates a C-shaped ring attachment means 106 and sleeve attachment means 126. The illustrated attachment means shown in FIG. 1A and FIG. 2 are for illustrative purposes only and any attachment means that rotatably attaches an adjusting ring to a sleeve known to those skilled in the art can be used.

Figure 3A:
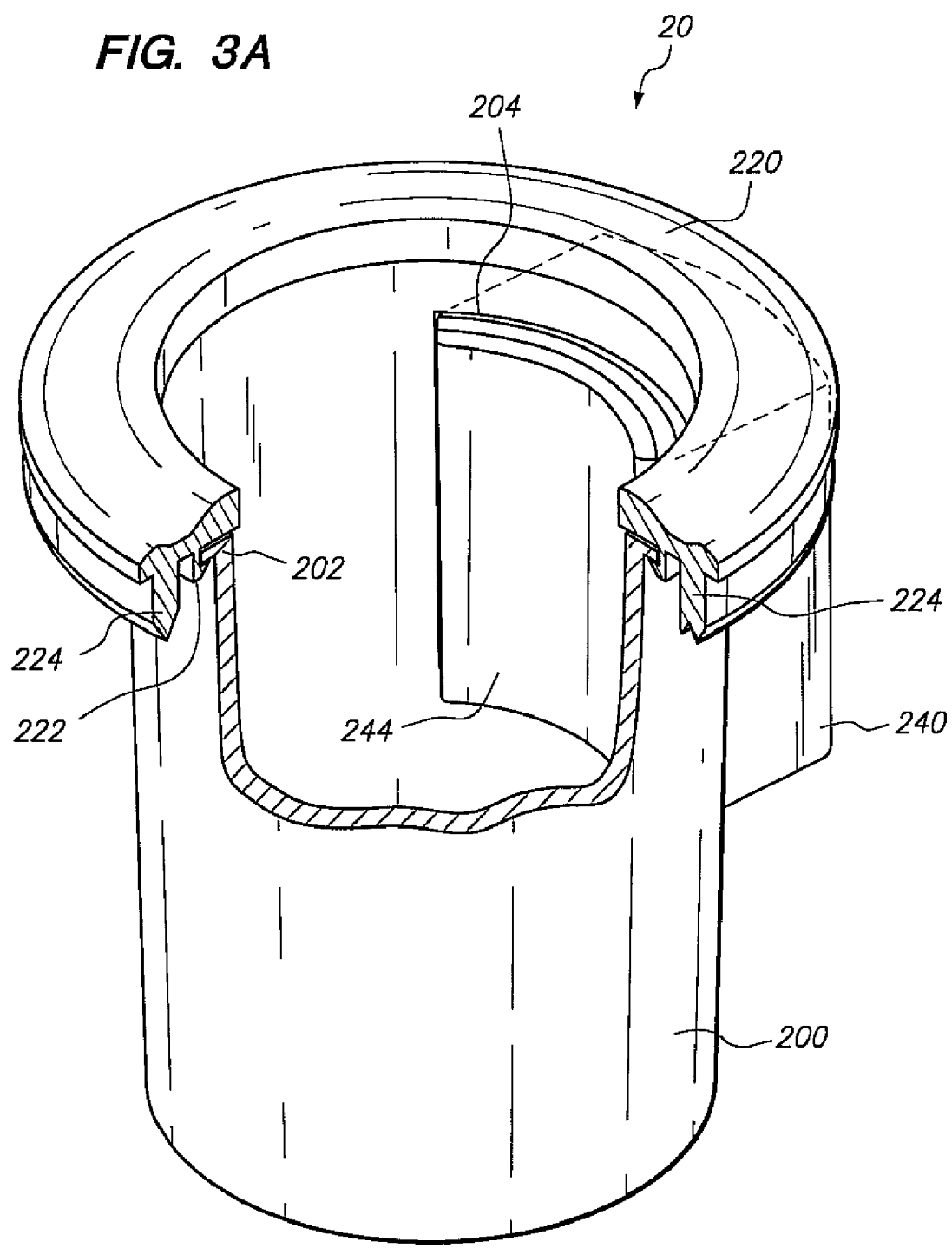
FIG. 3A is a perspective view of a second embodiment of the present invention.
Figure 3C:
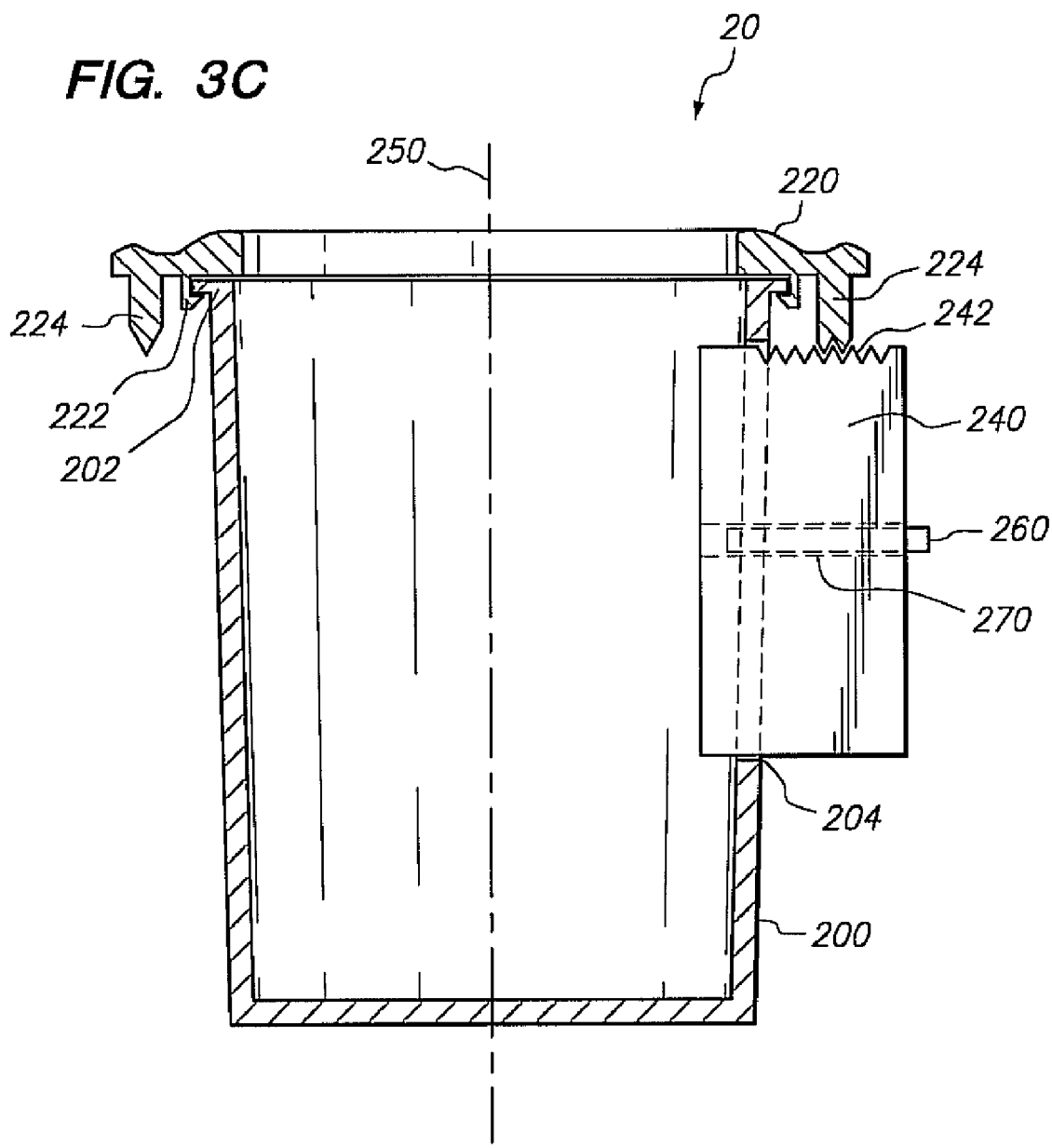
FIG. 3C is a side view of a second embodiment of the present invention.

A second embodiment of the present invention is shown in FIGS. 3A-3C. The second embodiment is comprised of a sleeve 200 with sleeve axis 250, an adjusting ring 220 and a movable jaw 240. The adjusting ring 220 is rotatably attached to the sleeve 200 using similar ring attachment means 202 and sleeve attachment means 222 as used in the first embodiment. The movable jaw 240 has a container surface 244 which is coaxial to the sleeve axis 250. The movable jaw 240 includes at least one groove 242, which engages rigid member 224 of adjusting ring 220.

Similar to the first embodiment, rotation of adjusting ring 220 with respect to sleeve 200 about sleeve axis 250 affords for the movement of the jaw 240 through a jaw aperture 204 in an inward or outward second direction 2. As jaw 240 moves in the inward direction, container surface 244 can contact a beverage container and securely hold said container. Movement of the jaw 240 in the outward directions affords for the release of a beverage container being securely held. Also similar to the first embodiment, the second embodiment does not require gear teeth and the location of rigid member 224 and groove 242 can be reversed.

The second embodiment further employs a guide rod 260 inserted within jaw guide rod aperture 270 to aid in the movement of jaw 240. The guide rod 260 is typically rigidly attached to an outer casing (not shown). In the alternative, guide rod 260 can be rigidly attached to sleeve 200.

Figure 4A:
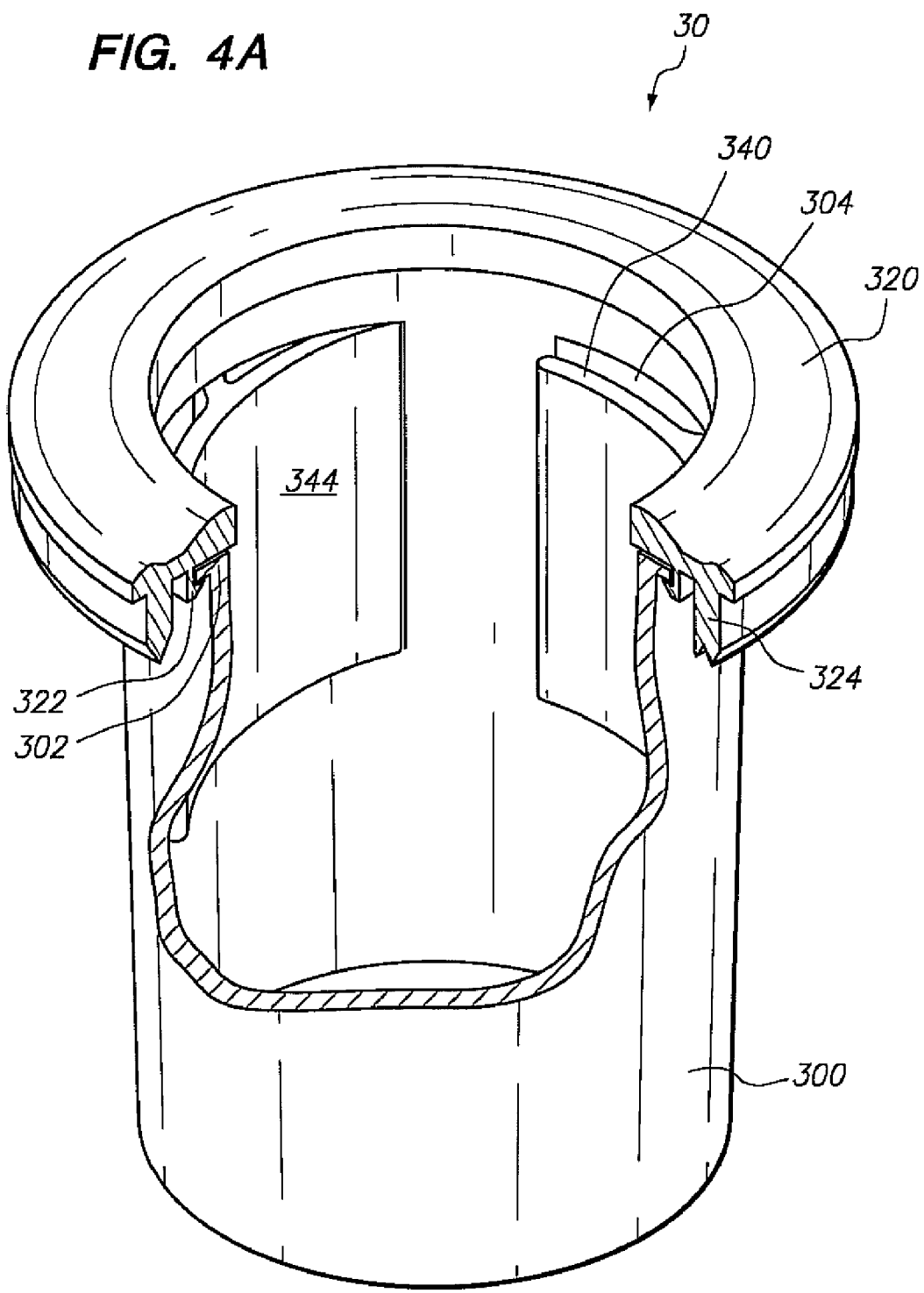
FIG. 4A is a perspective view of a third embodiment of the present invention.
Figure 4C:
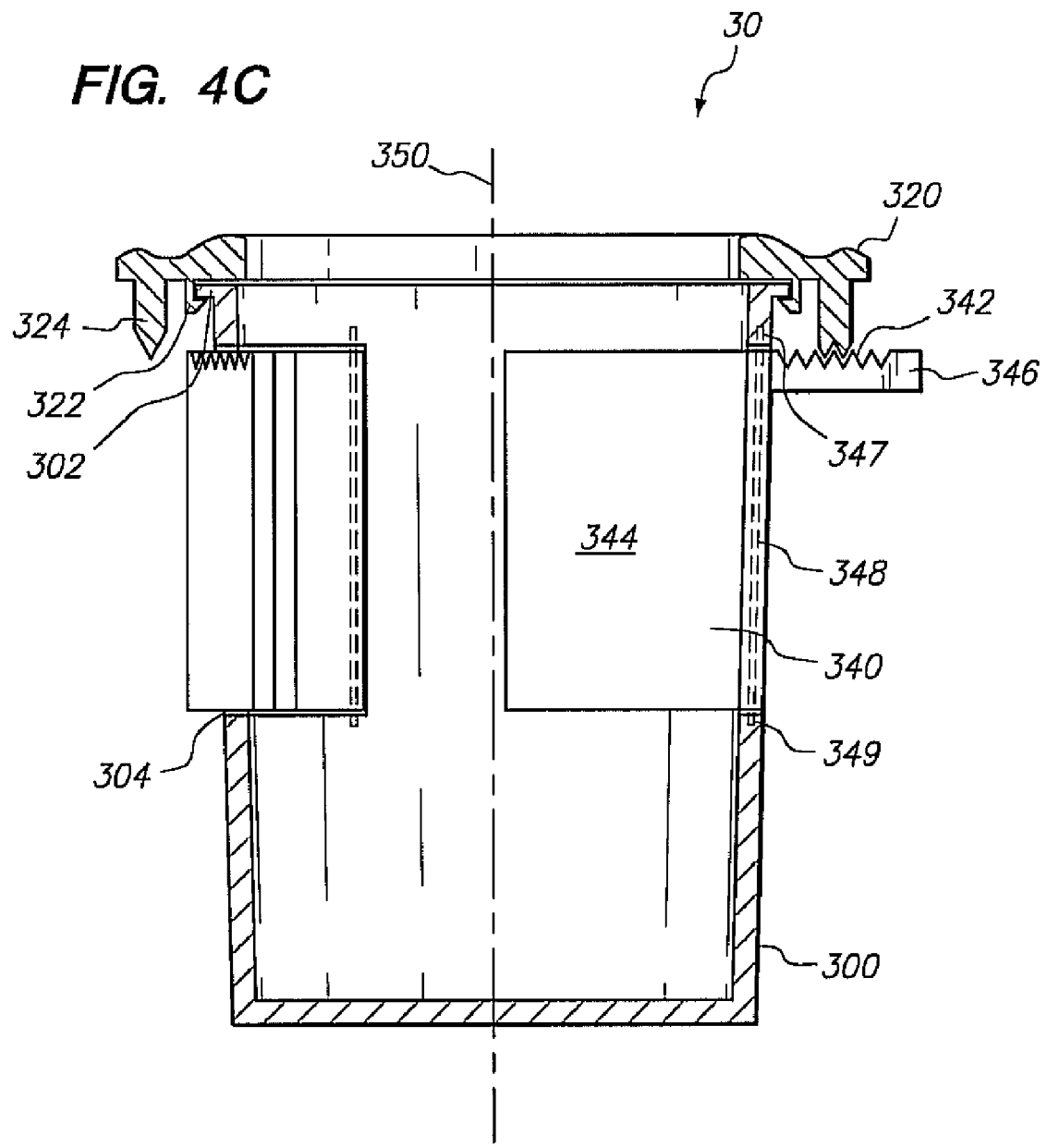
FIG. 4C is a side view of a third embodiment of the present invention.

A third embodiment of the present invention is shown generally at 30 in FIGS. 4A-4C. The third embodiment is comprised of a sleeve 300 with sleeve axis 350, an adjusting ring 320 and at least one rotatable jaw 340 that is located at least partially within a jaw aperture 304. Similar to the first and second embodiments, the sleeve 320 is rotatably attached to the sleeve 300 using a ring attachment means 302 and a sleeve attachment means 322.

Jaw 340 has a container surface 344 that is coaxial with sleeve axis 350. Jaw 340 also has a gear arm 346 with at least one groove 342 thereon. The gear arm 346 is rigidly attached to the jaw 340 and extends arcuately therefrom. The jaw 340 includes a rotation axis 348, said axis having a first end 347 and a second end 349, The first end 347 and second end 349 are rotatably attached to the sleeve 300 using an attachment means (not shown). The attachment means can be comprised of first end 347 and second end 349 being a rod or pin that fits within sleeve apertures or can be apertures into which fit sleeve rods or pins. Rotation of adjusting ring 320 in a clockwise or counterclockwise first direction 1 moves jaws 340 in an inward or outward second direction 2 due to the engagement of groove 342 with rigid engagement member 324. Similar to the first and second embodiments, the at least one groove 342 can be in the form of gear teeth, the location of groove 342 and rigid member 324 can be reversed and movement of jaws 340 affords for the secure holding and release of a securely held beverage container. In this manner, an adjustable beverage container holder is provided.

The materials of construction for the beverage container holder of the present invention can be any material known to those skilled in the art, illustratively including plastics, metals, alloys, ceramics and combinations thereof. Furthermore, the embodiments disclosed in FIGS. 1-4 illustrate the adjusting ring comprised of one piece. In the alternative, an adjusting ring, and a sleeve and/or jaw, can be comprised of more than one more piece.

The invention is not restricted to the illustrated examples described above. The examples are not intended as limitations on the scope of the invention. Methods, apparatus, materials and the like described herein are exemplary and not intended as limitations on the scope of the invention. Changes therein and other uses will occur to those skilled in the art, The scope of the invention is defined by the scope of the claims.

The invention claimed is:

1. An adjustable beverage container holder for holding a beverage container at least partially therein, said holder comprising:

a sleeve for receiving a beverage container, said sleeve having a sleeve axis;

a movable jaw located at least partially within said sleeve, said jaw having at least one groove and a container surface coaxial to said sleeve axis; and an adjusting ring rotatably mounted to a top portion of said sleeve, said adjusting ring having a rigid member engaged with said at least one groove of said movable jaw;

said adjusting ring and said movable jaw cooperating to receive the beverage container on an inside of said movable jaw such that said container surface can contact the beverage container by rotation of said adjusting ring, for the purpose of holding the beverage container once placed at least partially within said sleeve.

2. The adjustable beverage container holder of claim 1 further comprising a container holder with a plurality of jaws located at least partially within said sleeve.

3. The adjustable beverage container holder of claim 1 wherein said at least one groove includes gear teeth.

4. The adjustable beverage container holder of claim 1 wherein movement of said movable jaw is aided by a guidance means.

5. The adjustable beverage container holder of claim 4 wherein said guidance means is selected from the group consisting of a guide rod, a guide rail and combinations thereof.

6. The invention of claim 5 wherein said guide rod is fixedly attached to said sleeve.

7. The invention of claim 5 wherein said guide rod is fixedly attached to an outer casing.

8. The adjustable beverage container holder of claim 5 wherein said guide rail is fixedly attached to said sleeve.

9. An adjustable beverage container holder for holding a beverage container at least partially therein, said holder comprising:

a sleeve for receiving a beverage container, said sleeve having a sleeve axis;

a plurality of movable jaws located at least partially within said sleeve, said jaws having at least one groove and container surfaces coaxial to said sleeve axis;

an adjusting ring rotatably mounted to said a top portion of said sleeve, said ring having a rigid member engaged with said at least one groove of each said movable jaw, for the purpose of moving said jaw closer to and further away from said sleeve axis when said ring is rotated relative to said sleeve about said sleeve axis; and a guidance means, said guidance means aiding the guidance of said jaws and selected from the group consisting of a guide rod located within a jaw aperture, a guide rail fixedly attached to said sleeve, and combinations thereof;

said adjusting ring and said movable jaw cooperating to receive the beverage container on an inside of said movable jaw such that said container surface can contact the beverage container once received within said sleeve by rotation of said adjusting ring.

10. The adjustable beverage container holder of claim 9 wherein said at least one groove includes gear teeth.

11. The invention of claim 1 wherein said movable jaw includes a jaw pivot axis, said jaw axis located at least partially within said sleeve.

12. The invention of claim 11 wherein said jaw axis includes a jaw pivot rod, said rod fixedly attached to said sleeve.

13. The invention of claim 11 wherein said jaw includes a gear arm extending arcuately from said jaw.

14. The invention of claim 13 wherein said adjusting ring includes a rigid member engaged with said gear arm extending arcuately from said jaw.

15. An adjustable beverage container holder comprising:
- a sleeve for receiving a beverage container, said sleeve having a sleeve axis;
- a plurality of movable jaws located at least partially within said sleeve, said jaws having container surfaces coaxial to said sleeve axis and movable about a jaw pivot axis located at least partially within said sleeve;
- a gear arm having at least one groove, said gear arm fixedly attached and extending arcuately from each jaw; and
- an adjusting ring rotatably mounted to said sleeve, said ring having a rigid member engaged with said groove on each gear arm for the purpose of moving said jaw closer to and further away from said sleeve axis when said ring is rotated relative to said sleeve about said sleeve axis.

* * * * *

UNITED STATES PATENT AND TRADEMARK OFFICE
CERTIFICATE OF CORRECTION

PATENT NO.       : 7,497,409 B2
APPLICATION NO.  : 11/565153
DATED            : March 3, 2009
INVENTOR(S)      : Michael Joseph Lawlor It is certified that error appears in the above-identified patent and that said Letters Patent is hereby corrected as shown below:

Column 3, line 34, replace "349," with --349.--

Column 3, line 61, replace "art," with --art.--

Signed and Sealed this

Twenty-sixth Day of May, 2009

JOHN DOLL
*Acting Director of the United States Patent and Trademark Office*